July 28, 1959 E. SCHLUETER 2,896,897
SPRING LOCK FASTENER WITH ANGULAR ARM ENDS
Filed Sept. 6, 1955
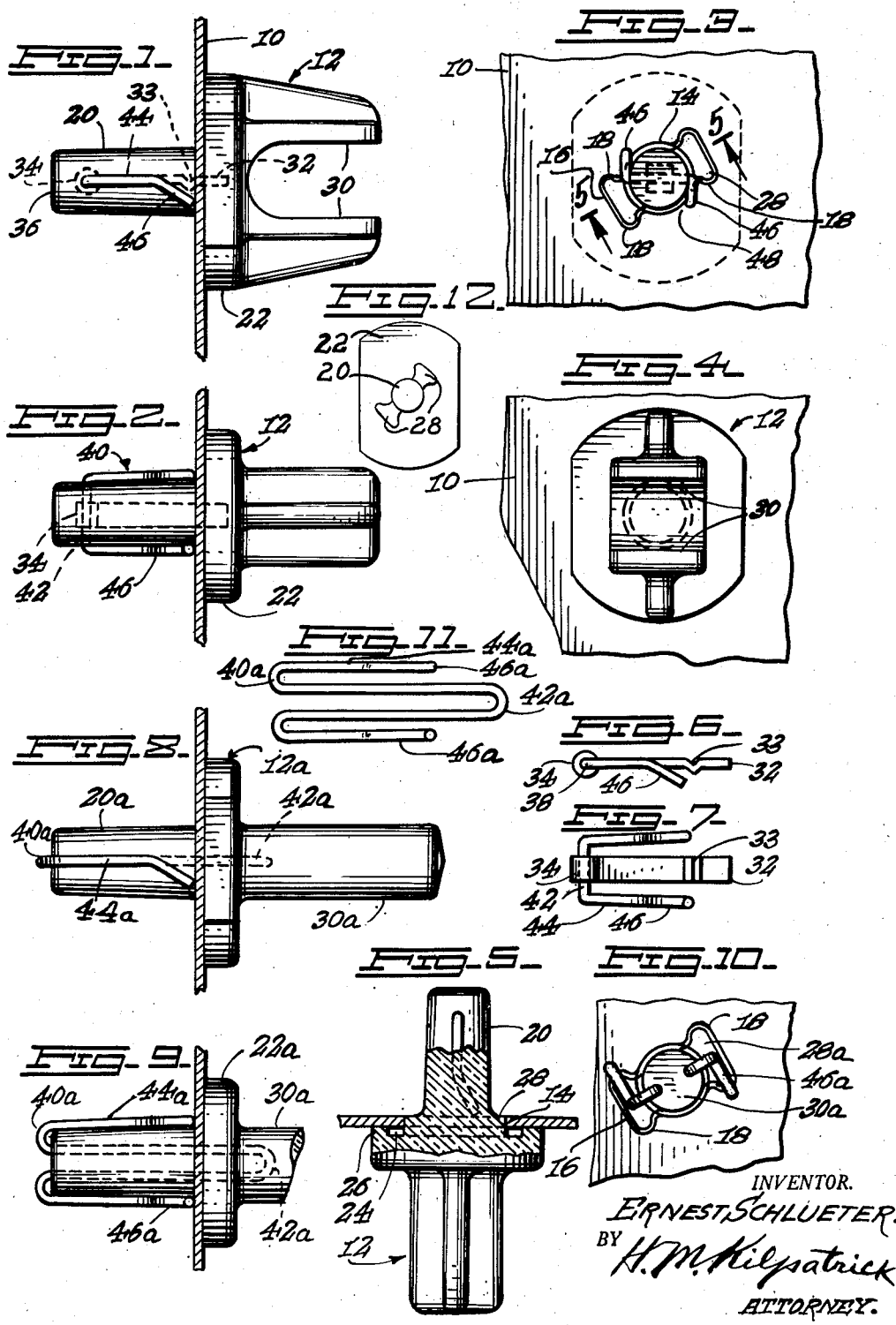
INVENTOR.
ERNEST SCHLUETER.
BY H. M. Kilpatrick
ATTORNEY.

United States Patent Office 2,896,897
Patented July 28, 1959

2,896,897

SPRING LOCK FASTENER WITH ANGULAR ARM ENDS

Ernest Schlueter, Troy, N.Y.

Application September 6, 1955, Serial No. 532,550

3 Claims. (Cl. 248—239)

This invention relates to fastening devices and brackets or supports and to means for securing the brackets or supports in place and more particularly to means for securing shelf supports or supporting brackets to plates or to the plastic liners of refrigerators though it is noted that in some of the claims the invention is not limited to supporting devices, as the device could also be used for securing plates in place.

Objects of the invention are to provide an improved fastening device of this kind which may be easily secured to and removed from a plastic refrigerator lining in place in the refrigerator.

Other objects of the invention are to provide improved devices of this kind and improved methods of making the same.

Additional objects of the invention are to effect simplicity and efficiency in such devices to provide an extremely simple device of this kind which is durable and reliable in use, and economical to manufacture and install.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with spring lock fasteners having angular arms, which briefly stated, include two types of brackets or supporting devices especially adapted to be secured to the plastic liner of a refrigerator or other plate member having therein a partially round hole having diametrically opposite notches communicating with the hole, the notches being elongated substantially tangentially to the circumference to form end recesses in each notch. Each supporting device is particularly designed to prevent mutilation of the liner when secured thereto. Each device comprises a locking stud having a shank disposable coaxially through said hole and having an outer head having a part for supporting a refrigerator shelf, the head having lugs of a shape adapted to fit in said notches. Wire locking arms of a locking member are secured to the inner end of the stud and disposed longitudinally on opposite sides of the shank, the free end part of the arm being preformed straight and angularly bent back at an obtuse angle in planes parallel to the shank and perpendicular to, and on opposite sides of a plane determined by the longitudinal parts of the arms, said free end part extending to near said head and being adapted when the stud is passed into said hole and rotated to pass into and through the notches and to cam through said recesses onto said plate member between the notches without mutilating the plate member.

Brackets of this type in which the wire locking arms are preformed straight throughout longitudinally of or diverged from the shank or which are preformed or become disposed spirally partly around the shank, it is an objection and defect that the wire arms badly mutilate the plastic liner when the bracket is fastened thereto. Many attempts for the last ten years have been made to prevent this, and it is only when the wire arms are formed substantially as shown and described herein that it has been possible to prevent this mutilation.

For many uses of the invention it is desirable that the exposed part of the bracket be of thermoplastic or other plastic material, and in one form of the invention the plastic stud is cast around strip metal disposed axially in said stud and having at its inner end an axially transverse aperture in which is received the yoke of a U-shaped wire locking member having its arms disposed longitudinally on opposite sides of the stud as above described.

In another form, a locking member of spring wire has an inwardly turned U-shaped part in said stud around which part the stud is cast, said wire having two arms connected to the U-shaped part at the inner end of the shank and disposed longitudinally on opposite sides of the stud as above explained.

In the accompanying drawing showing, by way of example two of many possible embodiments of the invention, Figs. 1 and 2 are respectively fragmental side elevation and plan showing one form of the bracket;

Figs. 3 and 4 are fragmental end elevations showing opposite ends of the bracket;

Fig. 5 shows a section on the line 5—5 of Fig. 3;

Figs. 6 and 7 are side elevation and plan of the locking member;

Figs. 8, 9 and 10 are respectively, side elevation, plan and end elevation of a second form of the invention;

Fig. 11 is a plan of the locking member of said second form, and

Fig. 12 is a reduced scale end view of the invention of Fig. 1, the plate and locking member being removed, showing the lugs.

My improved bracket or supporting device is especially suitable for supporting shelves in refrigerators and to be secured to a plastic plate member 10 such as the plastic liner of the refrigerator without mutilating the liner.

The refrigerator liner has therein a plurality of holes 14 disposed at suitable places for securing the brackets 12 and 12a for supporting the shelves.

Each hole 14 is partially round and has diametrically opposite large notches 16 communicating with the hole at an elongated portion of the circumference, the notches being elongated substantially tangentially to the circumference of the hole and longer than said communicating portion for forming a pair of end recesses 18 to the notch for a purpose which will appear.

Each bracket or fastening device 12 comprises a plastic locking stud having a shank 20 disposable coaxially through said hole 14 and has an outer head 22 having an inset intramarginal part 24 (Fig. 5) having a raised margin 26 engageable with the plate member 10. Said intramarginal part adjacent to the shank is provided with raised lugs 28 of a shape adapted to be received and fit in the notches 16 of the plate member. The head has a spaced pair of supporting projections 30 between which a shelf or other structure may slide and be supported.

An axial spine or core 32 of flat metal strip is disposed axially in said shank and head, around which core the shank and head are cast. The core has an intermediate anti-slip notch 33 (Fig. 6) and has an inner end 34 disposed near the inner end 36 of the shank and curved upon itself to form an axially elongated transverse aperture 38 (Fig. 6).

A substatnially U-shaped wire locking member 40 having a straight transverse yoke 42 in said aperture has its two arms 44 disposed on opposite sides of the stud about two thirds of the arm adjacent to the yoke being disposed substantially longitudinally of the stud, the free end portion 46 approximately a third of the arm being bent back at an obtuse angle, the arms being bent back in planes perpendicular to and on opposite sides of, a plane determined by the shank axis, the longitudinal part of the arms and said yoke 42, the end portions 46 extending toward the head and having free ends near said head and facing the head and engageable with engagement portions 48 of the plate member between the notches, when the stud is assembled in the hole, as will be explained.

Said arms and ends being adapted when the stud is assembled in said hole to pass into and through the notches and when the stud member is rotated forwardly to cam through said recesses 18 onto said portions 48, without mutilating the plate member, to hold the bracket in place, said lugs moving into the notches to hold the stud against rotation.

If the arms 44, 46 are made sufficiently resilient, sufficient pull on the projections 30 may withdraw the lugs from the notches, and on further rotation of the stud, the arms may move into the notches and allow withdrawal of the stud from the hole. If the arms are very stiff it may be difficult or impossible to withdraw the lugs from the notches to remove the stud from the holes. The projections 30 facilitate rotating the stud.

In the form of invention of Figs. 8 to 12 the plastic plate member 10 is the same as in Figs. 1 to 5. The plastic locking stud or bracket 12a is nearly the same and has a shank 20a disposable through the hole and has an outer head 22a carrying a coaxial rod like supporting part 30a on which a shelf may rest and has lugs 28a (Fig. 10) to fit in the notches 16.

The locking member 40a of spring wire is different and has a long inwardly turned U-shaped part 42a in said stud around which part the stud is cast, the arms of said U-shaped part pass through the inner end of the shank 20a and are bent back at the inner end of the shank to form arms 44a disposed longitudinally on opposite sides of the stud, the free end part 46a of the arm being straight and bent back at an obtuse angle, to the longitudinal part, in planes perpendicular to and on opposite sides of a plane determined by the longitudinal parts of the arms, said free end parts extending to near said head 22a and adapted when the stud is passed into said hole and rotated to pass into and through the notches 16 and to cam through said recesses 18 onto said engagement portions, without mutilating the plate member, to hold the brackets 12a in place.

I claim as my invention:

1. A supporting device comprising a plastic locking stud comprising a shank having an outer head having a supporting part; a metal strip disposed axially in said stud and around which the shank is cast and having at its inner end an axially transverse aperture; and a U-shaped wire locking member having a yoke in said aperture and two arms disposed longitudinally on opposite sides of the stud, the free end part of the arms being straight and bent back at obtuse angles in planes perpendicular to, and on opposite sides of, a plane determined by the shank axis and said yoke, said free end part extending toward and to near said support part.

2. A supporting device comprising a plastic locking stud comprising a shank having an outer head having a supporting part; and a locking member of spring wire having an inwardly turned U-shaped part in said stud around which part the stud is cast, said wire having two arms connected to the U-shaped part at the inner end of the shank and disposed longitudinally on opposite sides of the stud, the free end part of the arms being straight and bent back at an obtuse angle, to the longitudinal part, in planes perpendicular to, and on opposite sides of, a plane determined by the longitudinal parts, said free end part extending to near said head.

3. A supporting device comprising a plastic locking stud comprising a shank having an outer head having a supporting part; a metal strip disposed axially in said stud and around which the shank is cast and having at its inner end an axially transverse aperture; and a U-shaped wire locking member having a yoke in said aperture and two arms disposed longitudinally on opposite sides of the stud, the free end part of the arms being straight and bent back a distance from the shank at obtuse angles in planes perpendicular to, and on opposite sides of, a plane determined by the shank axis and said yoke, said free end part extending to near said supporting part.

References Cited in the file of this patent

UNITED STATES PATENTS

| | | |
|---|---|---|
| 2,179,604 | Tinnerman | Nov. 14, 1939 |
| 2,244,976 | Tinnerman | June 10, 1941 |
| 2,244,978 | Tinnerman | June 10, 1941 |
| 2,626,773 | Backman | Jan. 27, 1953 |
| 2,629,913 | Schlueter | Mar. 3, 1953 |
| 2,643,433 | Scott | June 30, 1953 |